Jan. 9, 1945.  D. M. LIGHT  2,366,918
SNUBBER
Filed Sept. 21, 1942
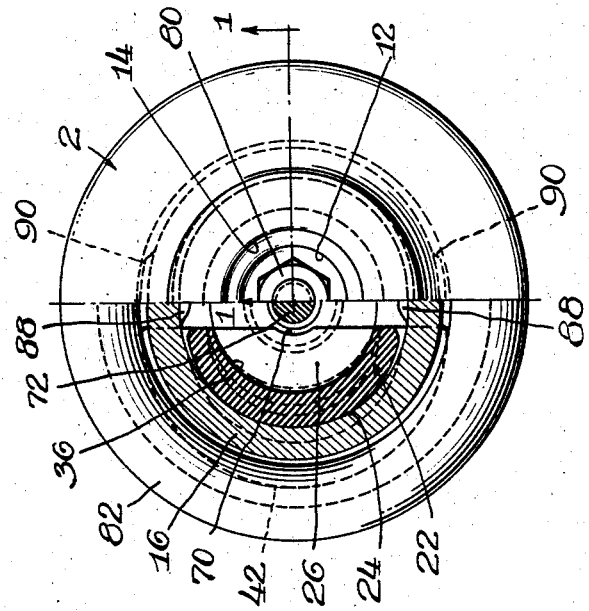
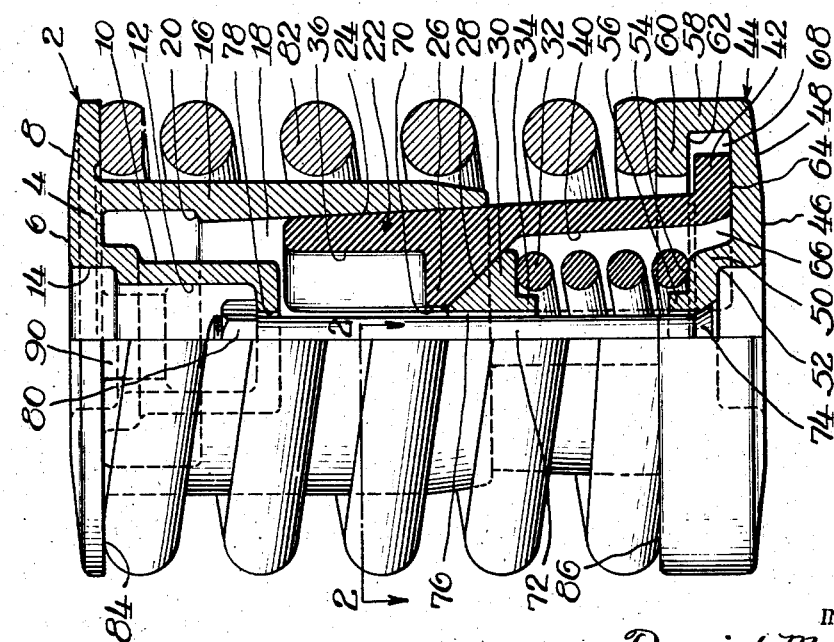
INVENTOR.
David M. Light
BY
Atty Patented Jan. 9, 1945

2,366,918

UNITED STATES PATENT OFFICE 2,366,918

SNUBBER

David M. Light, Chicago, Ill., assignor to American Steel Foundries, Chicago, Ill., a corporation of New Jersey Application September 21, 1942, Serial No. 459,086

19 Claims. (Cl. 267—9)

My invention relates to a friction device and especially to such a device for use in railway equipment in conjunction with coil springs in a bolster supporting coil spring group. My novel device has a general form and arrangement suitable to permit its substitution for one or more of the coils in said group.

The general object of my invention is to devise a practical form of friction device of the character above indicated which may act as a means of dampening the oscillations of coil springs with which it may be associated and thus reducing or eliminating harmonic spring action in the spring group.

My novel friction device comprehends a follower having a friction barrel arranged for the reception of a pair of identical friction shoes which may be actuated by means interconnecting said shoes with a spaced follower, said shoes and said barrel being enclosed within a compression spring.

A specific object of my invention is to devise a friction device or snubber such as above described in which the friction shoes are slidably seated on a bottom follower and are interlocked therewith by means of arcuate bases or flanges on said shoes received within an annular recess formed in said bottom follower, said shoes being maintained in frictional engagement with the friction barrel on the top follower by means of an auxiliary spring seated on the bottom follower and supporting a wedge in diagonal face engagement with ledges on said shoes.

A further object of my invention is to design an arrangement such as above described in which the top follower comprises a depending hollow boss receiving therewithin a nut threaded on the end of a bolt engaged with the bottom follower, said nut and the upper end of said bolt being slidable within said hollow boss during compression of the snubber, and said boss being accommodated within arcuate recesses in the respective shoes during said compression.

My invention comprehends a friction follower of novel form, said follower comprising an annular member adapted to provide a seat for one end of the snubber, an annular substantially vertical flange about the perimeter of said member, said flange being inwardly reflanged to define an annular recess adapted for the reception of the associated friction shoes in the manner above described, and said member comprising centrally thereof a hollow boss affording a seat for the associated end of an auxiliary compression spring serving to maintain said shoes in engagement with an associated friction barrel as above described.

In the drawing, Figure 1 is a side view of my novel snubber, the left half thereof being a view in elevation and the right half thereof being a sectional view taken in the plane indicated by the line 1—1 of Figure 2, and Figure 2 is a top view of the structure shown in Figure 1, the right half thereof being a plan view, and the left half thereof being a sectional view taken substantially in the plane indicated by the line 2—2 of Figure 1.

Describing my invention in detail, the top follower generally designated 2 comprises the annular base 4 affording a seat as at 6 for an associated supported member, said base being tapered at 8 to afford a rocking movement for said member on said seat. The top follower 2 also comprises a depending hollow boss 10 defining a cylindrical cavity 12 widened at the top thereof as at 14 in order to afford convenient means for the reception of a boss or other positioning means on the associated supported member, as will be clearly apparent to those skilled in the art. Integrally formed with the base 4 is an oval friction barrel 16 comprising the oppositely spaced arcuate diagonally arranged friction surfaces 18, 18 (Figure 1), each of said surfaces being relieved as at 20 to prevent the wearing of a shoulder on the associated friction shoe, as will be clearly apparent.

My novel snubber comprises a pair of substantially identical friction shoes generally designated 22, 22, each of said shoes being in complementary frictional engagement at 24 with the associated friction surface 18 and comprising a ledge 26 in diagonal face engagement at 28 (Figure 1) with a wedge member 30 supported on an auxiliary coil spring 32, said wedge comprising an annular boss 34 projecting within the associated end of said spring 32 and affording convenient positioning means therefor, and above the ledge 26 said shoe is provided with an arcuate cavity 36 formed and arranged for reception of the boss 10 on the compression stroke of the snubber, as will be clearly apparent. Below the ledge 26 each shoe is formed with an arcuate cavity 40 affording partial housing for the auxiliary coil spring 32 and on the bottom thereof said shoe is provided with an arcuate base or flange 42 interlocked with the bottom follower generally designated 44 in a manner hereinafter more fully described.

The bottom follower 44 is an annular member affording a seat for the snubber at 46 on the bottom surface thereof, and said member is tapered as at 48 in order to accommodate a rocking movement of said snubber on the seat 46. Centrally thereof the bottom follower comprises the hollow upstanding boss 50 comprising the cylindrical cavity 52 formed and arranged for the reception of positioning means on an associated supporting member, as will be clearly apparent to those skilled in the art, the boss 50 affording a seat at 54 for the auxiliary coil spring 32 and comprising an upstanding annular positioning flange 56 projecting into the lower end of said spring.

The bottom follower 44 is formed with an upstanding annular flange 58 about the perimeter thereof, said flange being provided with an inturned reflange 60 defining a recess 62 formed and arranged for the reception of the bases 42, 42 on the associated friction shoes whereby said shoes are interlocked with the bottom follower, as will be clearly apparent from a consideration of the right half of Figure 1. It may be noted that the bases 42, 42 of the friction shoes are slidably seated at 64 on the bottom follower and said bases are afforded clearance from the boss 50 as indicated at 66 (Figure 1) and clearance from the flange 58 as indicated at 68, the clearance at 66 permitting the shoes to move inwardly on the compression stroke and the clearance at 68 affording outward movement of said shoes to accommodate wear at 24 between the shoes and the associated surfaces 18, 18 on the friction barrel.

Thus it will be apparent that as the top and bottom followers move toward each other during the compression stroke the friction shoes will be afforded sliding movement at 64 on the bottom follower toward the axis of the snubber, said movement being induced by the diagonal friction face engagement at 24 between the shoes and the friction surfaces on the friction barrel 16.

It may be noted that the ledge 26 of each friction shoe 22 is afforded an arcuate indentation at 70 affording clearance for said ledge from the retaining bolt 72, said bolt comprising a head 74 countersunk in the hollow boss 50 and secured thereto by any convenient means such as welding. The bolt extends upwardly through the annular flange 56 in the boss 50, through the auxiliary coil spring 32, through an opening 76 in the wedge 30, and through an opening 78 in the hollow boss 10 depending from the top follower 2, and the top of the bolt 72 is secured by means of a nut 80 threaded thereon. It will be clearly understood that the bolt and nut assembly 72, 80 maintain the top and bottom follower in assembled relationship on the release stroke and afford vertical movement therebetween on the compression stroke, the bolt 72 being afforded slidable movement through the opening 78, and the nut 80 being afforded vertical movement within the cavity 12 of the hollow boss 10.

A coiled compression or load spring 82 is seated at 84 against the base 4 of the top follower and is seated at 86 on the flange 58 and the reflange 60 of the bottom follower, said spring 82 being sleeved over the friction barrel 16 and the friction shoes 22, 22.

It may be noted that the friction barrel 16 is provided with the internal projections 88, 88 (Figure 2) in order that the shoes will be assembled in engagement with the complementary friction surfaces 18, 18 on said barrel, and said barrel is also provided with the external projections 90, 90 (Figure 2) providing positioning means for the top follower with respect to the load spring 82.

It will be understood that although I have described the follower 2 as a top follower and the follower 44 as a bottom follower, the snubber may, if desired, be inverted with the follower 44 as a top follower and the follower 2 as a bottom follower.

It will be further understood that if desired the engagement between the friction shoes and the friction barrel at 24, 24 may be along substantially vertical planes.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction device, a bottom follower affording a seat for said device upon an associated supporting member, an upstanding annular flange formed about the perimeter of said follower, said flange being reflanged to define with said follower an annular recess, friction shoes comprising bases slidably seated on said bottom follower and projecting into said recess for interlocking engagement therewith, a wedge member in diagonal face engagement with respective shoes, a coil spring seated on said bottom follower and affording support for said wedge member, a top follower comprising a friction barrel having internal oppositely spaced diagonally arranged arcuate friction surfaces in complementary engagement with respective shoes, a hollow boss on said top follower depending within said barrel and defining a cylindrical cavity, a coiled spring sleeved over said barrel and said shoes and seated at opposite ends thereof against respective followers, and means for maintaining said device in assembled relationship, said means comprising a bolt fixed to the bottom follower extending upwardly through the first-mentioned coil spring, through an opening in said wedge member, between said shoes, and through an opening in the bottom of said hollow boss, and a nut threaded on the end of said bolt in said cavity, said shoes being provided with arcuate recesses formed and arranged for the reception of said hollow boss on the compression stroke of said device.

2. In a snubber, a top follower comprising a base affording a seat for an associated supported member, a coil spring seated against said base, a friction barrel on said follower sleeved within said spring and comprising oppositely spaced arcuate diagonal friction surfaces, friction shoes engaged with respective surfaces and each comprising a ledge portion, a wedge in complementary diagonal face engagement with said ledge portions, an auxiliary spring supporting said wedge, a bottom follower affording a seat for said snubber on an associated supporting member, means interlocking said bottom follower with said shoes, and means on said bottom follower affording seats for said springs, said interlocking means comprising an annular recess in said bottom follower and arcuate bases on said shoes slidably seated on said bottom follower and received within said recess.

3. In a snubber, a top follower comprising a base affording a seat for an associated supported member, a coil spring seated against said base, a friction barrel on said follower sleeved within said spring and comprising oppositely spaced arcuate diagonal friction surfaces, friction shoes engaged with respective surfaces, a wedge in complementary diagonal face engagement with said shoes, an auxiliary spring supporting said wedge, a bottom follower affording a seat for said snubber on an associated supporting member, means interlocking said bottom follower with said shoes, means on said bottom follower affording seats for said springs, a retaining bolt secured to said bottom follower and slidably engaged with depending hollow means on said top follower, and recesses in respective shoes affording clearance for said depending means on the compression stroke of the snubber.

4. In a friction absorbing device, a follower, a friction barrel thereon, an inwardly directed hollow boss in said barrel and defining a cavity, friction shoes maintained in frictional engagement with complementary diagonal arcuate surfaces on said barrel, a bottom follower interlocked with said shoes, a resilient member seated on said bottom follower and supporting a wedge member in wedge engagement with said shoes, a coil spring under compression between said followers, and means for maintaining said followers in assembled relationship, said means comprising a bolt fixed to said bottom follower, extending between said shoes, and slidably extending through openings in said wedge member and said boss, and a nut threaded on said bolt in said cavity, said shoes comprising arcuate recesses in the top thereof and adapted for reception of said boss on the compression stroke of said device.

5. In a follower for a friction absorbing device, an annular plate-like member affording on the bottom surface thereof a seat for associated support means, said member having on the top thereof a flat surface affording a seat for associated friction shoes, a hollow boss upstanding from the center of said member to define a cavity for the reception of positioning means on said support means, a spring seat on the top of said boss, and an upstanding annular flange on the outer perimeter of said member, said flange being spaced from said boss and being inwardly reflanged to form an annular recess for the reception of interlocking means on said shoes.

6. In a friction absorbing device, a bottom follower, an annular upstanding flange on said follower inwardly reflanged to define an annular recess therewith, friction shoes comprising bases slidably seated on said bottom follower and projecting into said recess for interlocking engagement with said follower, a top follower comprising a friction barrel having internal surfaces in frictional engagement with respective shoes, resilient means supported by said bottom follower and supporting wedge means operable to maintain said shoes in said engagement, and a coil spring sleeved over said barrel and said shoes and seated at opposite ends thereof against the reflanged portion of said bottom follower and an aligned portion of said top follower.

7. In a friction absorbing device, a follower, an annular recess therein, friction shoes comprising means received within said recess for interlocking engagement therewith, the adjacent ends of said shoes being seated against said follower, a spaced follower comprising friction surfaces in engagement with said shoes, means maintaining said shoes in said engagement, and yielding means adapted to resist movement of said followers toward each other, said maintaining means comprising a resilient member seated on the first-mentioned follower and a wedge member supported on said resilient member and in complementary diagonal face engagement with respective shoes, said yielding means being seated at one end thereof against said spaced follower and being seated at the opposite end thereof against a portion of said first-mentioned follower forming said recess.

8. In a friction absorbing device, a follower comprising an inwardly directed hollow boss defining a cavity, a friction barrel on said follower, friction shoes maintained in frictional engagement with internal surfaces on said barrel, a bottom follower interlocked with said shoes, means for maintaining said followers in assembled relationship and comprising a bolt fixed to the bottom follower, extending between said shoes, and slidably extending through an opening in said boss, a nut threaded on said bolt in said cavity, and a coil spring under compression between said followers.

9. In a friction absorbing device, a follower, a friction barrel therein, an inwardly directed hollow boss in said barrel and defining a cavity, friction shoes in frictional engagement with internal surfaces on said barrel, means maintaining said shoes in said engagement, a spaced follower interlocked with said shoes, a coil spring under compression between said followers, and means for maintaining said followers in assembled relationship, said means comprising a bolt fixed to said spaced follower, extending between said shoes, and slidably extending through an opening in said boss, and a nut member on said bolt in said cavity.

10. In a friction absorbing device, a bottom follower affording a seat for said device upon an associated supporting member, an annular upstanding flange on said follower inwardly reflanged to define an annular recess therewith, friction shoes comprising arcuate bases projecting into said recess for interlocking engagement with said follower, said shoes being seated at their lower ends against said follower, a top follower comprising friction means engaged with said shoes, means including resilient means operable to maintain said shoes in said engagement, and independent resilient means engaged with respective followers, said last-mentioned resilient means being seated at one end thereof against the reflanged portion of said bottom follower.

11. In a follower for a friction absorbing device, an annular plate-like member affording on the bottom surface thereof a seat for associated support means, said member having on the top thereof a flat surface affording a seat for associated friction shoes, a hollow boss upstanding from the center of said member to define a cavity for the reception of positioning means on said support means, a spring seat on the top of said boss, an upstanding annular flange on the outer perimeter of said member, said flange being spaced from said boss and being inwardly reflanged to form an annular recess for the reception of interlocking means on said shoes, and a flat annular spring seat surface on the top of said reflange, said flat surfaces lying in parallel planes.

12. In a friction absorbing device, a bottom follower of annular form, an annular upstanding flange on the outer perimeter of said follower inwardly reflanged to define an annular recess therewith, friction shoes comprising interlocking means projecting into said recess, the lower ends of said shoes being seated against said bottom follower, a top follower comprising friction means engaged with said shoes, resilient means operable to maintain said shoes in said engagement, and independent resilient means engaged with the respective followers for resisting movement thereof toward each other, said last-mentioned resilient means being seated against the reflanged portion of said bottom follower.

13. In a follower for a friction absorbing device, a substantially annular member and an annular flange on the outer perimeter of said member extending substantially perpendicularly thereto, said flange being reflanged to define with said member a recess for the reception of retaining means on an associated friction shoe, the reflanged portion of said flange extending substantially parallel to said member and being formed and arranged to afford a spring seat on the surface thereof remote from said member, said member presenting spaced annular surfaces within said recess for interlocking engagement with said retaining means.

14. In a friction absorbing device, a follower, a substantially annular vertical flange around the margin thereof, said flange being inwardly reflanged to define with said follower an annular recess, friction shoes comprising interlocking means received within said recess, the adjacent ends of said shoes being seated against said follower, another follower comprising friction means in frictional engagement with said shoes, means maintaining said shoes in said engagement, and yielding means seated against said reflange and said second-mentioned follower for resisting movement of said followers toward each other.

15. In a friction absorbing device, an annular follower, a substantially vertical annular flange around the outer perimeter thereof, said flange being inwardly reflanged to define with said follower an annular recess, friction shoes comprising interlocking means received within said recess, the adjacent ends of said shoes being seated against said follower, a spaced follower comprising a friction barrel having internal friction surfaces in engagement with said shoes, means maintaining said shoes in said engagement, and yielding means seated against said reflange and against said spaced follower for resisting movement of said followers toward each other, said second-mentioned means comprising wedge means bearing against said shoes, and resilient means bearing against said wedge means and said first-mentioned follower.

16. In a friction absorbing device, a follower having a friction barrel with an internal friction surface, a spaced follower comprising an annular member having on one side thereof a surface affording a seat for the device, a central hollow boss on the opposite side of said member defining a cavity for the reception of positioning means, an annular flange projecting from the outer perimeter of said member, said flange being inwardly reflanged to afford a spring seat and to define an annular recess, friction shoes having base portions received within said recess for interlocking engagement therewith, the ends of said shoes remote from said first-mentioned follower being seated against said member, a spring seated on said boss, wedge means on said spring in complementary wedge engagement with said shoes for urging the same into engagement with said friction surface, and a spring sleeved over said barrel and seated against said first-mentioned follower and against said spring seat.

17. In a friction absorbing device, a follower having a friction barrel with an internal friction surface, a hollow boss on said follower disposed within said barrel and defining a cavity for the reception of positioning means on an associated member, a spaced follower comprising an annular member having on one side thereof a surface affording a seat for the device against an associated member, a central hollow boss on the opposite side of said annular member defining a cavity for the reception of positioning means, an annular flange projecting from the outer perimeter of said annular member, said flange being inwardly reflanged to afford a spring seat and to define an annular recess, friction shoes having base portions received within said recess for interlocking engagement therewith, the ends of said shoes remote from said first-mentioned follower being seated against said annular member, a spring seated on said second-mentioned boss, wedge means on said spring in complementary wedge engagement with said shoes for urging the same into engagement with said friction surface, a spring sleeved over said barrel and seated against said first-mentioned follower and said spring seat, and a retaining bolt and nut assembly extending through said first-mentioned spring and through aligned openings in both of said bosses and said wedge means, said bolt and nut assembly being secured at one end thereof to one of said bosses and being slidably interlocked with the other of said bosses whereby said friction device is maintained in assembled relationship.

18. In a follower for a friction absorbing device, a substantially annular member and an annular flange on the outer perimeter of said member extending substantially perpendicularly thereto, said flange being inwardly reflanged to define with said member a recess for the reception of retaining means on an associated friction shoe, a hollow boss projecting from said member centrally of said recess, and spaced parallel spring seat surfaces on said boss and said reflanged portion respectively.

19. In a friction absorbing device, a follower comprising an inwardly directed hollow boss defining a cavity, a friction barrel on said follower, friction shoes in frictional engagement with an internal surface on said barrel, means urging said shoes into said engagement, a spaced follower interlocked with said shoes, means for maintaining said followers in assembled relationship and comprising a bolt fixed to said spaced follower, extending between said shoes, and slidably extending through an opening in said boss, and means on said bolt in said cavity for interlocking engagement with said boss to limit expansion of the device, and a coil spring under compression between said followers.

DAVID M. LIGHT.